(12) United States Patent
Nakamura

(10) Patent No.: US 6,761,569 B2
(45) Date of Patent: Jul. 13, 2004

(54) CARD CONNECTOR DEVICE

(75) Inventor: Hidehiro Nakamura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 46 days.

(21) Appl. No.: 10/256,907

(22) Filed: Sep. 26, 2002

(65) Prior Publication Data

US 2003/0068927 A1 Apr. 10, 2003

(30) Foreign Application Priority Data

Oct. 10, 2001 (JP) .......................................... 2001-312357

(51) Int. Cl.⁷ ............................................. H01R 13/62
(52) U.S. Cl. ........................ 439/159; 439/630; 439/607
(58) Field of Search ................................ 439/159, 630, 439/607

(56) References Cited

U.S. PATENT DOCUMENTS

| | | | | |
|---|---|---|---|---|
| 5,324,204 A | * | 6/1994 | Lwee ........................... | 439/64 |
| 5,474,468 A | * | 12/1995 | Chishima et al. ........... | 439/495 |
| 5,784,253 A | * | 7/1998 | Ooka et al. .................. | 361/686 |
| 6,042,403 A | * | 3/2000 | Nishioka ..................... | 439/159 |
| 6,113,403 A | * | 9/2000 | Oguchi ........................ | 439/159 |

FOREIGN PATENT DOCUMENTS

| | | |
|---|---|---|
| JP | 2000-251025 | 9/2000 |
| WO | WO01/44871 | 7/2001 |

OTHER PUBLICATIONS

Nishioka, "Card Connector Having IC Card Ejection Mechanism," Pub. No. US2001/0012712, Pub. Date Aug. 9, 2001, 19 Pages.

Nishioka, "IC Card Connector Having IC Card Ejection Mechanism," Pub. No. US2001/0008812, Pub. Date Jul. 19, 2001, 21 Pages.

* cited by examiner

Primary Examiner—Dean A. Reichard
Assistant Examiner—Anton Harris
(74) Attorney, Agent, or Firm—Beyer Weaver & Thomas

(57) ABSTRACT

A slide member disposed to a housing in which a card is mounted and engaged with the card to be movable in an insertion and ejection direction of the card as the card is inserted and ejected, is formed of one metal plate, and in the slide member, a lock pin urging part for supporting a lock pin to enable swing and for urging its one end toward a heart-shaped cam groove, an elastic fastening part for holding the card at a mount position by engagement with a fastening recess part of the card, and a guide part for guiding movement when the card is moved in the insertion and ejection direction are integrally formed by bending.

6 Claims, 6 Drawing Sheets

CARD CONNECTOR DEVICE

BACKGROUND OF THE INVENTION

1. Field of the Invention

The present invention relates to a structure of a card connector device used for a small memory card or the like for use in various portable information terminals such as a portable telephone or a PC, or memory support equipment such as a digital camera or digital AV equipment.

2. Description of the Related Art

A card connector device is generally used as an expansion recording device of electronic equipment such as a personal computer or a digital camera. A PC card or a memory card has been widely used as a storage medium of this card connector device.

This PC card or memory card is mounted in the card connector device to write and read necessary information, and some card connector device is provided with a lock mechanism for holding a slide member, which houses a card and can move in an insertion direction of the card, at a mount position of the card. There is known one having such a structure that in a case where the card held at the mount position is ejected to an ejection position, the lock of the locked slide member is released to move the slide member in an ejection direction of the card by the urging force of a return spring urging the slide member toward the ejection direction of the card, so that the card, together with the slide member, is pushed out.

The lock mechanism is provided with a heart-shaped cam groove having a lock part, a lock pin slidable along this heart-shaped cam groove, and an urging spring for urging one end of this lock pin toward the heart-shaped cam groove, and the structure is such that with the movement of the slide member, the lock pin is moved in the heart-shaped cam groove and is locked to the lock part, and when the card is once pressed, the lock of the slide member is released and the card is ejected.

In this case, although the slide member is locked to the mount position of the card by the lock mechanism, the card is held only by a terminal pressure of a connector terminal or the like at the mount position, and there is a fear that the card falls out by vibration or the like, and therefore, in order to ensure the holding of the card, there is recently proposed such a structure that an elastic projecting piece having elasticity is formed at the slide member housing the card, and this elastic projecting piece is made to engage with a fastening recess part of the card at the mount position so that the card is held.

However, in the above-described conventional card connector device, it is necessary that the slide member is provided with the elastic projecting piece for holding the mounted card and the urging spring for urging the lock pin toward the heart-shaped cam groove, and there have been problems that since the number of parts becomes large, the number of assembling steps is increased, and the workability becomes complicated so that the cost is raised.

SUMMARY OF THE INVENTION

Accordingly, the invention has an object to solve the foregoing problems and to provide a card connector device including a slide member engaged with a card and to be movable as the card is inserted and ejected, in which the number of parts of an ejection mechanism for ejecting the card is reduced, and the workability of assembly is simplified so that a low price can be realized.

In order to solve the problems, first means of the invention comprises a housing in which a card is mounted, a slide member disposed to engage with the card and to be movable in an insertion and ejection direction of the card as the card is inserted and ejected, a return spring for urging the slide member toward the ejection direction of the card, and lock means including a lock pin and a heart-shaped cam groove along which the lock pin slides, for locking the slide member at a mount position of the card against an urging force of the return spring and for releasing a lock by moving the slide member from the lock position to a back side, and is characterized in that the slide member is formed of one metal plate, and in the slide member, a lock pin urging part for supporting the lock pin to enable swing and for urging its one end toward the heart-shaped cam groove, an elastic fastening part for holding the card at the mount position by engagement with a fastening recess part of the card, and a guide part for guiding movement when the card is moved in the insertion and ejection direction are integrally formed by bending.

Besides, second means is characterized in that the heart-shaped cam groove is formed at a front end side of the housing in the card insertion direction, the lock pin sliding along the heart-shaped cam groove projects from a front edge part of the slide member and is supported, and the lock pin urging part is shaped into a plate spring having elasticity by folding back the front edge part of the slide member rearward.

Besides, third means is characterized in that the lock pin urging part is provided with an insertion part through which one end side of the lock pin is inserted to enable swing, folded parts positioned at both edges of the insertion part, and a pressing part coupled to the folded parts, for urging one end of the lock pin toward the heart-shaped cam groove, and the pressing part is formed to be long in a direction orthogonal to a projecting direction of the lock pin.

Besides, fourth means is characterized in that projecting parts projecting from the front edge part of the slide member are formed in the folded parts, and the one end of the lock pin is disposed between both the projecting parts.

Besides, fifth means is characterized in that a return spring for urging the slide member toward the ejection direction of the card is disposed at a rear end side of the housing in which the heart-shaped cam groove is formed at a front end side, and the slide member is formed to overlap with the heart-shaped cam groove when the slide member is moved to the mount position of the card.

Besides, sixth means is characterized in that the guide part is formed by bending one side edge part of the slide member toward an inner bottom surface side of the housing, and a concave guide groove corresponding to the one side edge part is formed in the inner bottom surface of the housing.

DETAILED DESCRIPTION OF THE PREFERRED EMBODIMENTS

Figure 1:
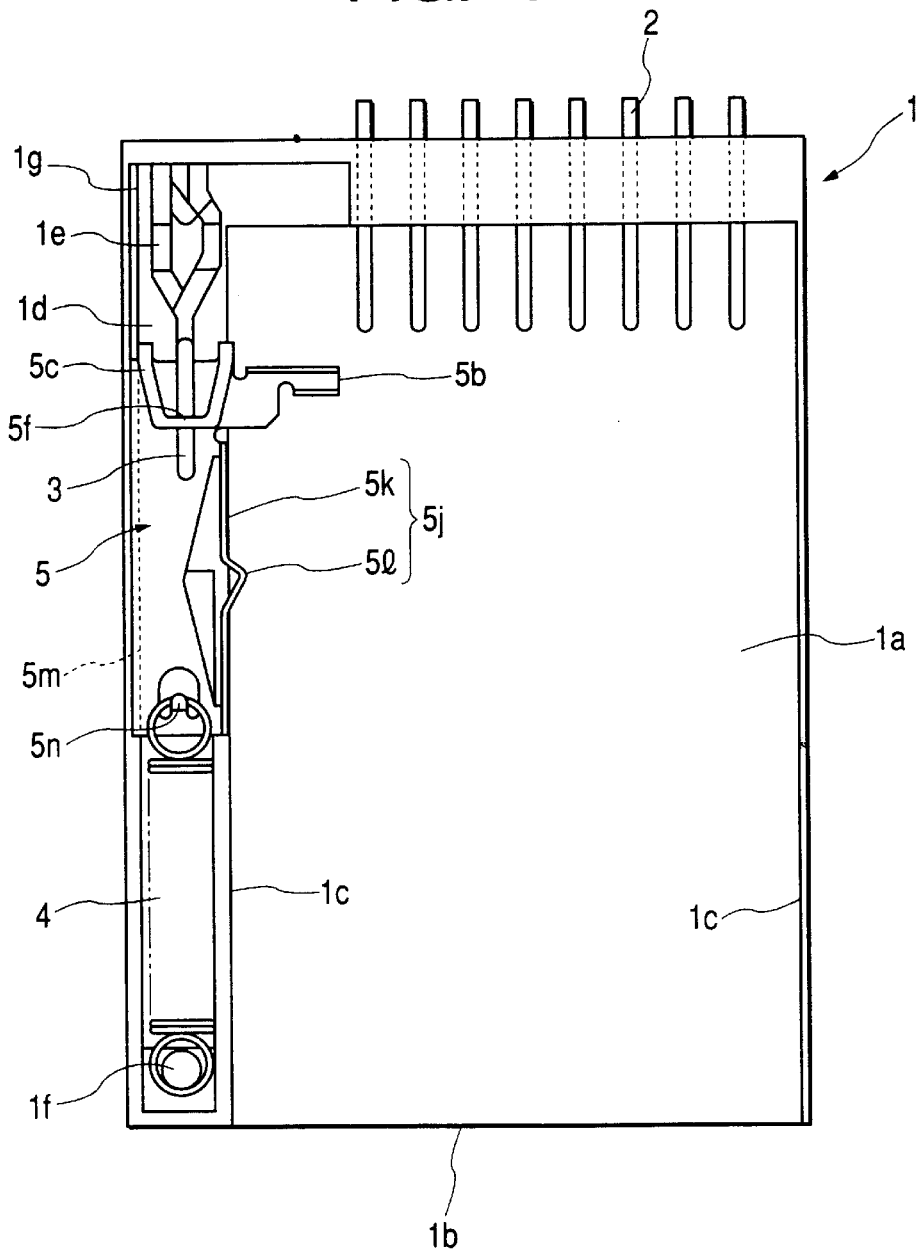
FIG. 1 is a plan view showing a card connector device of an embodiment of the invention.
Figure 2:
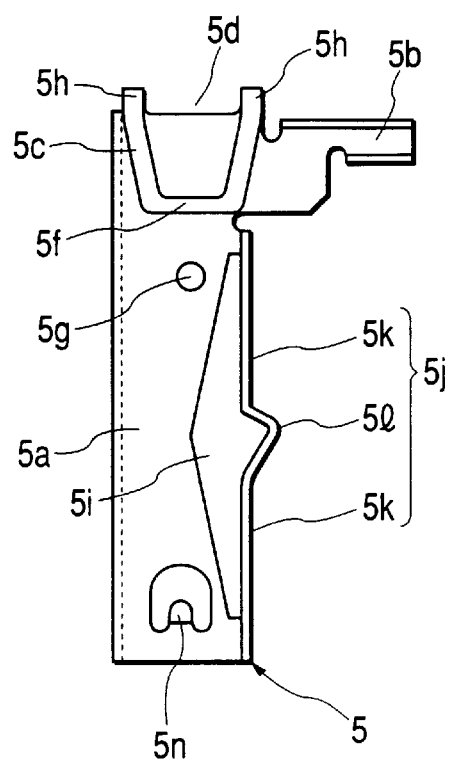
FIG. 2 is a plan view showing a slide member of the invention.
Figure 3:
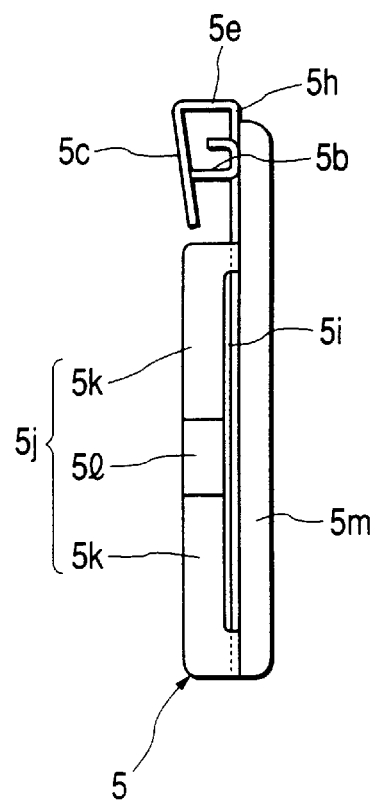
FIG. 3 is a side view showing the slide member of the invention.
Figure 4:
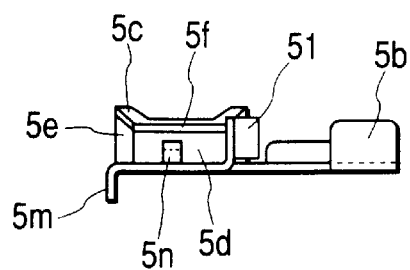
FIG. 4 is a front view showing the slide member of the invention.
Figure 5:
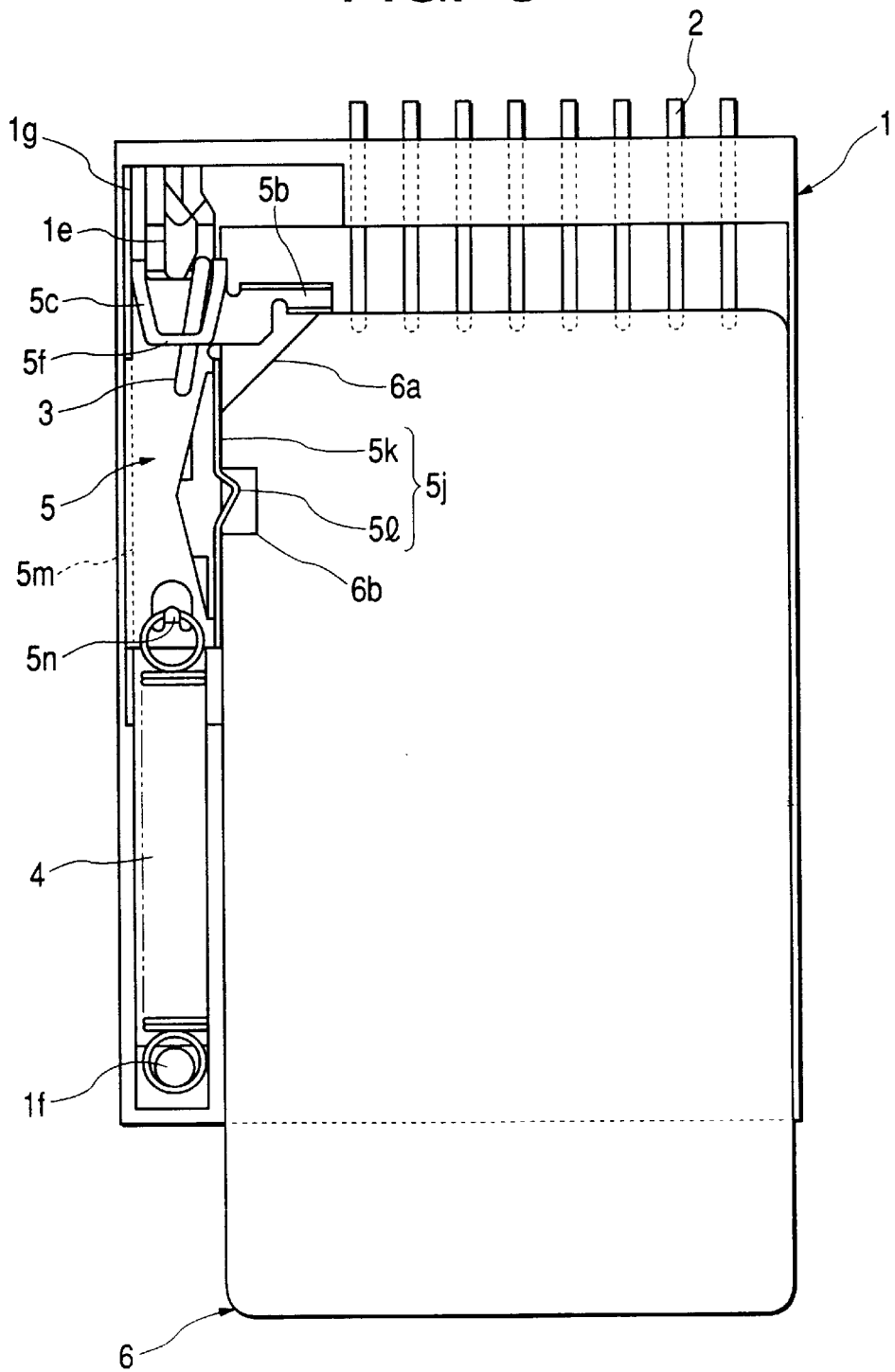
FIG. 5 is an explanatory view showing an operation state in the middle of insertion of a card according to the invention.
Figure 6:
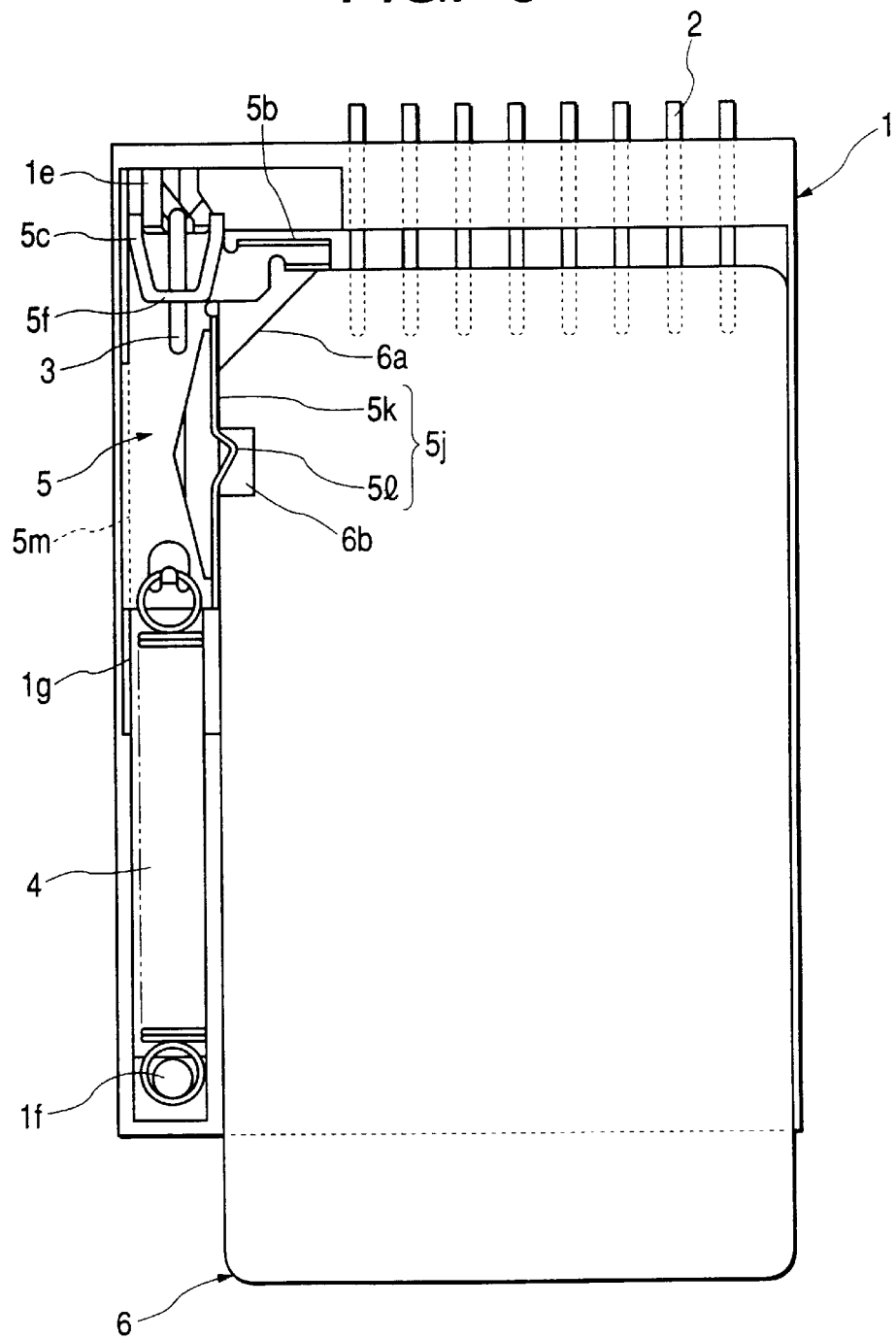
FIG. 6 is an explanatory view showing an operation state at a mount position (lock position) of the card according to the invention.
Figure 7:
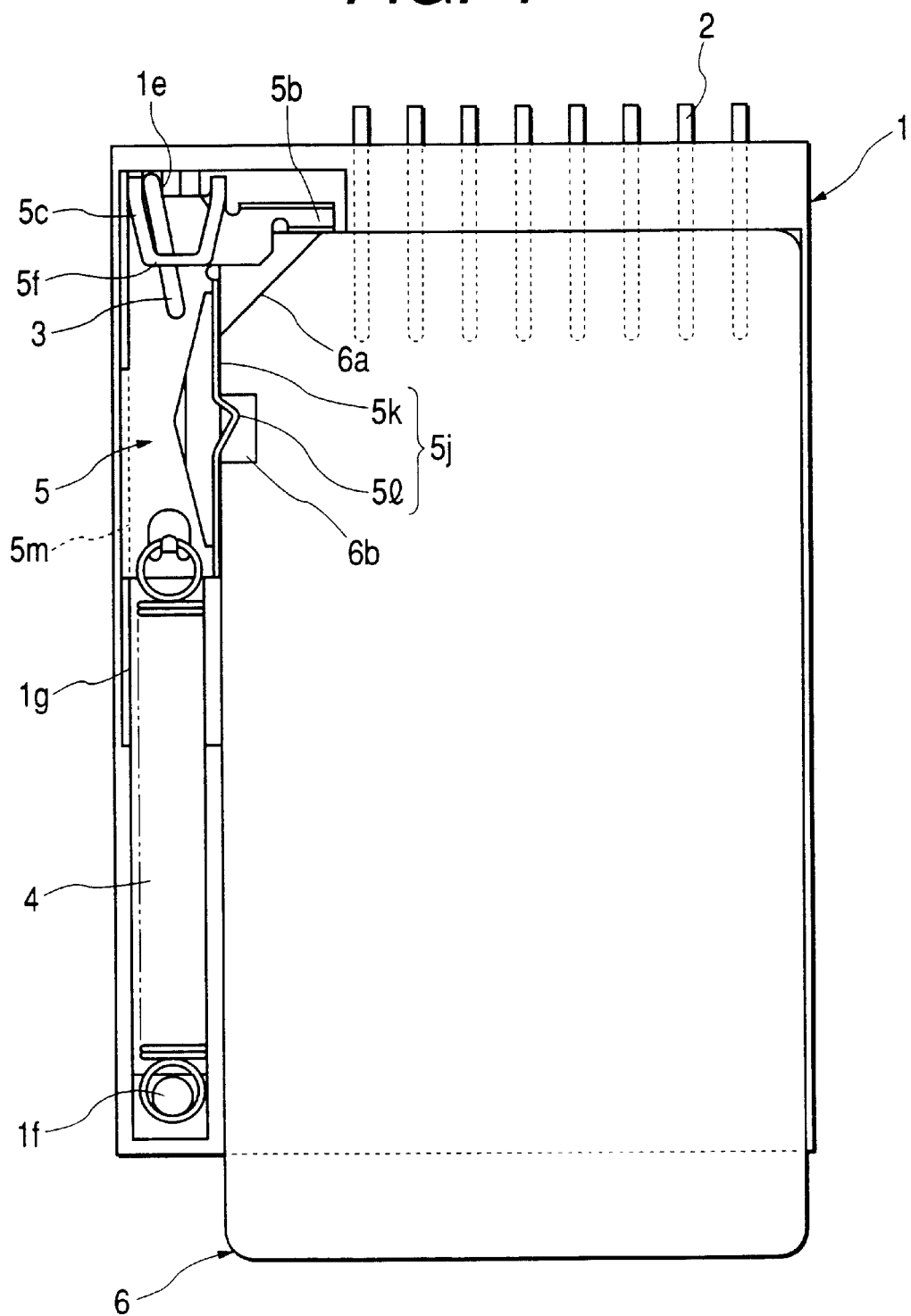
FIG. 7 is an explanatory view showing an operation state at a release position (overstroke position) of the card according to the invention.
Figure 8:
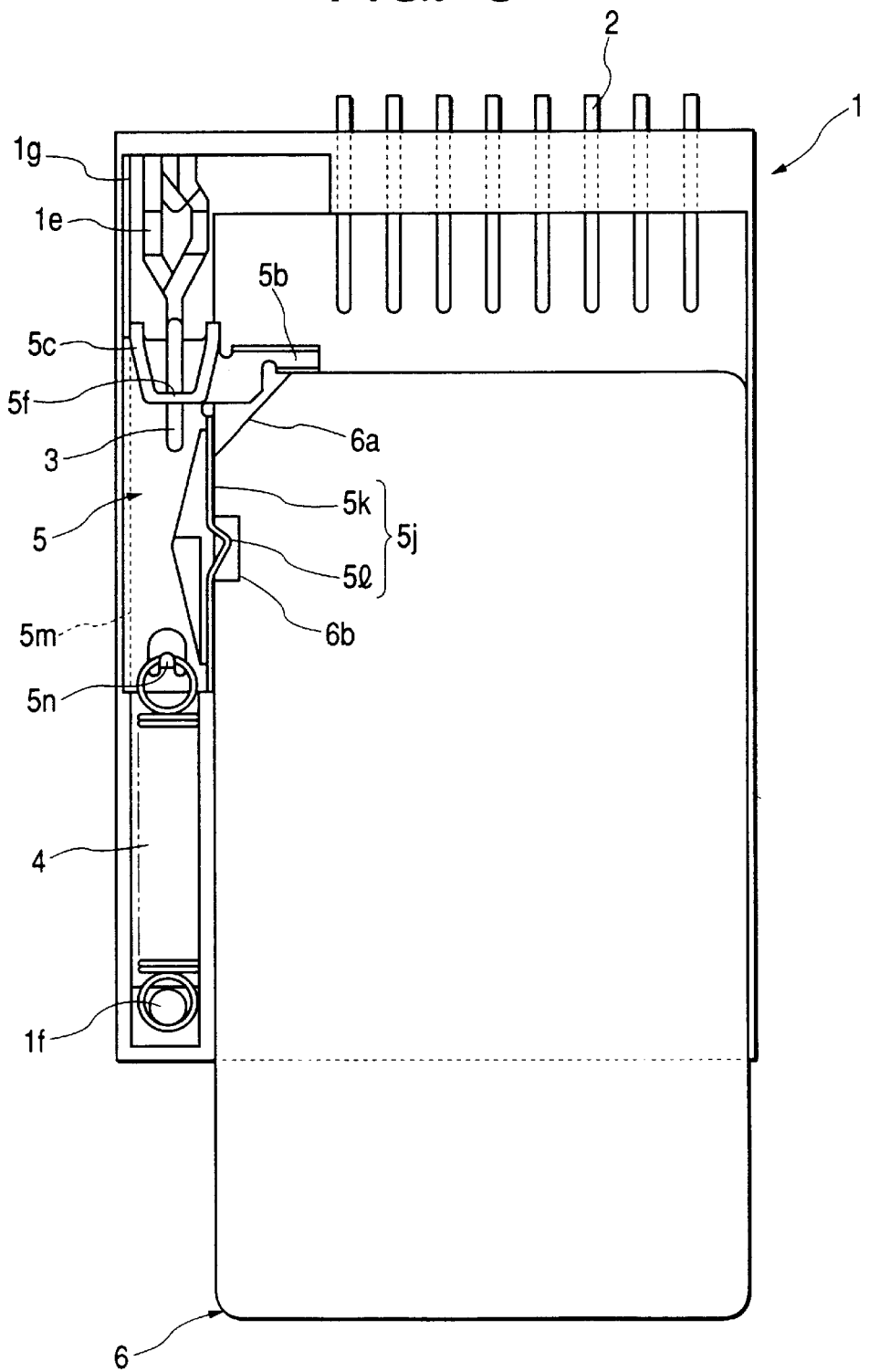
FIG. 8 is an explanatory view showing an operation state at an ejection position (initial position) of the card according to the invention.

Hereinafter, embodiments of the invention will be described in FIGS. 1 to 8. FIG. 1 is a plan view of a card connector device, FIG. 2 is a plan view of a slide member, FIG. 3 is a side view of the same, FIG. 4 is a front view of the same, and FIGS. 5 to 8 show operation states at the time of insertion and ejection of a card, in which FIG. 5 is an explanatory view showing the middle of insertion of the card, FIG. 6 is an explanatory view showing a mount position (lock position) of the card, FIG. 7 is an explanatory view showing a release position (overstroke position) of the card, and FIG. 8 is an explanatory view showing an ejection position (initial position) of the card.

In FIGS. 1 to 4, a housing 1 is formed of an insulating material, such as a synthetic resin, into a square box shape with a front opening and an upper opening. A housing part 1a for housing a card is provided at the center of this housing 1, and a card insertion part 1b communicating with the housing part 1a is formed at the front of the housing 1.

Besides, plural connector terminals 2 which come in contact with a contact terminal part (not shown) of the housed card and are connected to a circuit pattern on an external circuit board of an electronic equipment or the like to transmit signals, are provided in parallel with each other at the back side of the housing part 1a opposite to the card insertion part 1b. Besides, insertion guide parts 1c for guiding insertion by guiding side edge parts of the card when the card is inserted are provided at both side parts of the housing part 1a.

A flat part 1d with a bottom is provided at one side part of the housing 1 alongside of the housing part 1a, and an after-mentioned slide member 5 is disposed in this flat part Id to be movable in an insertion direction of the card.

Besides, an annular heart-shaped cam groove 1e made of plural oblique planes and flat planes is formed at the front end side of the flat part 1d. One end side of a lock pin 3 made of a substantially U-shaped metal material, which is supported by a shaft hole 5g of the after-mentioned slide member 5 to enable swing, slides along the heart-shaped cam groove 1e, so that the slide member 5 is locked to a mount position of the card, and is moved to an ejection position.

Then, the slide member 5 is formed to overlap with the heart-shaped cam groove 1e when the after-mentioned slide member 5 is moved to the mount position of the card, and a spring fastening part 1f to which one end of a coil-like return spring 4 urging the after-mentioned slide member 5 toward an ejection direction of the card is fastened, is formed at the rear end side opposite to the heart-shaped cam groove 1e.

As stated above, since the front end part of the slide member 5 is formed to overlap with the heart-shaped cam groove 1e, and the return spring 4 is disposed behind the slide member 5, the lock pin 3 does not project forward greatly, and therefore, the length of the return spring 4 can be made long by that, and an ejection stroke of the card can be made large.

Besides, a guide groove 1g of a thin groove shape is formed in the flat part 1d along the insertion direction of the card, and a guide part 5m of the after-mentioned slide member 5 is engaged with this guide groove 1g. As stated above, by providing the guide groove 1g, the after-mentioned slide member 5 can be smoothly moved in the insertion and ejection direction of the card.

The slide member 5 is formed to be substantially L-shaped by punching one metal plate with a press into a necessary shape or the like and by bending it at plural places. This slide member 5 includes a base part 5a of a flat and substantially rectangular shape, and a card receiving part 5b extended in an intersecting direction at the tip end side of this base part 5a. This card receiving part 5b projects into the housing part 1a of the housing 1, comes in contact with a front edge of an after-mentioned card 6 to be inserted, and moves the slide member 5 in the insertion direction of the card.

Besides, a substantially U-shaped lock pin urging part 5c bent from this base part 5a at right angles and further folded back rearward is integrally formed at the front edge part of the base part 5a. This lock pin urging part 5c is supported at the bent part in a cantilever state, and its tip end is shaped into a plate spring having elasticity and is urged toward the upper surface side of the base part 5a.

As stated above, since the lock pin urging part 5c is provided by folding back the front edge part of the slide member 5, the lock pin 3 does not project forward greatly, and therefore, it becomes unnecessary to take a large movement stroke of the slide member 5, and the depth size of the housing 1 can be made small.

The lock pin urging part 5c is provided with an insertion part 5d formed of a rather wide opening through which one end side of the lock pin 3 is inserted to enable swing, a pair of folded parts 5e positioned at both edges of this insertion part 5d to be opposite to each other, and a pressing part 5f coupled to the folded parts 5e and extended to have an arm shape, for urging one end of the lock pin 3 toward the heart-shaped cam groove 1e, and the tip end side of this pressing part 5f is formed to be long in a direction orthogonal to a projecting direction of the lock pin 3. Besides, the shaft hole 5g by which the other end of the lock pin 3 is supported is formed in the vicinity of the lock pin urging part 5c.

As stated above, since the pressing part 5f is provided to be long, when the lock pin 3 is horizontally swung with the shaft hole 5g as a fulcrum, a constant urging force can be made to be exerted at any position irrespective of a swing position, and therefore, the lock pin 3 can be stably moved along the heart-shaped cam groove 1e.

Besides, projecting parts 5h are formed at the pair of folded parts 5e so as to project from the front edge part of the slide member 5, and one end of the lock pin 3 is disposed between both the projecting parts 5h to enable swing. As stated above, since the projecting parts 5h are provided, one end side of the lock pin 3 inserted through the insertion part 5d to enable swing is restrained by the projecting parts 5h, and therefore, it is possible to prevent sliding down or the like of the lock pin 3 at the time of assembling.

Besides, an elastic fastening part 5j both ends of which are bent at right angles through an opening 5i and the center part of which is a long plate, is integrally formed at one side edge part of the base part 5a. This elastic fastening part 5j includes an elastic arm part 5k extending along a length direction of the slide member 5 and elastically deformable, and an engagement projecting part 5l provided at the center of this elastic arm part 5k and engaging with a fastening recess part 6b formed at a side part of the after-mentioned card 6.

At the time of mounting of the card, the engagement projecting part 5l of the elastic fastening part 5j is engaged with the fastening recess part 6b of the card 6, and the card 6 is certainly held at the mount position of the card.

Besides, at the opposite other side edge part of the base part 5a, a long guide part 5m is integrally formed by bending a part of this side edge part at right angles toward an inner bottom surface side of the housing 1. This guide part 5m is engaged with the guide groove 1g of the housing 1 and guides the movement of the slide member 5 in the insertion and ejection direction of the card.

Besides, a hook-shaped spring fastening part 5n to which the other end of the return spring 4 engaged with the spring fastening part 1f of the housing 1 is fastened, is provided at the rear end side of the base part 5a, and the slide member 5 is urged toward the ejection direction of the card by the urging force of the return spring 4. At this time, by the cooperation between the lock pin 3 and the heart-shaped cam groove 1e, the slide member 5 is held at the mount position of the card against the urging force of the return spring 4.

The card 6 houses therein an integrated circuit (IC) and is widely used as a recording medium. Plural contact terminal parts (not shown) are formed at one end side on one surface of this card 6, and the contact terminal parts come in contact with the plural connector terminals 2 disposed in the housing part 1a of the housing 1, so that various information processings to externally connected electronic equipment are performed.

Besides, a notch part 6a of an oblique plane shape is provided at one corner part of the front end side of the card 6, and a fastening recess part 6b is formed in the vicinity of this notch part 6a and at one side part of the card 6. The engagement projecting part 5l of the elastic fastening part 5j of the slide member 5 is engaged with this fastening recess part 6b, so that the card 6, together with the slide member 5, is held at the mount position of the card.

Next, the operation in the case where the card 6 is inserted into the connector device will be described by the use of FIGS. 5 to 8.

First, at an initial state, that is, in a case where the card 6 is at an ejection position, the slide member 5 is urged toward the ejection direction of the card by the urging force of the return spring 4. In this case, the contact terminal parts (not shown) of the card 6 are separate from the connector terminals 2 of the housing 1. At this time, the fastening recess part 6b is engaged with the engagement projecting part 5l of the elastic fastening part 5j so that the card 6 is held by the slide member 5. (FIG. 8) Next, when the card 6 is pressed in the insertion direction of the card, the front end edge of the card 6 is engaged with the card receiving part 5b of the slide member 5, so that the slide member 5 can be moved in the insertion direction as the card 6 is inserted, and the slide member 5 is moved in the insertion direction of the card against the urging force of the return spring 4. (FIG. 5) Then, one end of the lock pin 3 traces the heart-shaped cam groove 1e and is locked to the lock position, that is, the mount position of the card. At this time, the contact terminal parts (not shown) of the card 6 comes in contact with the connector terminals 2 disposed in the housing 1, and the card 6 is certainly held to the mount position of the card by the urging force of the elastic arm part 5k of the elastic fastening part 5j. (FIG. 6)

Next, in the case where the card 6 is ejected, when the card 6 is further pressed from the state of FIG. 6 to the back, that is, in the insertion direction of the card, the slide member 5 is moved to the back, and one end of the lock pin 3 comes off from the lock part of the heart-shaped cam groove 1e. (FIG. 7)

Then, when the pressing to the card 6 is released, the slide member 5 is returned to the initial position as the ejection position of the card by the urging force of the return spring 4. (FIG. 8)

As stated above, since lock means comprised of the heart-shaped cam groove 1e and the lock pin 3 sliding along this heart-shaped cam groove 1e, for locking the slide member 5 at the mount position of the card and for causing the card 6 to be ejected by the slide member 5 by once moving the slide member 5 from the lock position to the back to release the lock state, is provided between the slide member 5 and the housing 1, the card 6 can be locked to the mount position of the card by the simple structure, and the card 6 can be smoothly ejected to the ejection position of the card.

Besides, since the pressing part 5f for urging one end of the lock pin 3 toward the heart-shaped cam groove 1e is formed in the lock pin urging part 5c formed in the slide member 5, and the tip end side of this pressing part 5f is formed to be long in the direction orthogonal to the projecting direction of the lock pin 3, when the lock pin 3 is swung horizontally with the shaft hole 5g as the fulcrum, a constant urging force can be exerted at any position irrespective of a swing position, and therefore, the lock pin 3 can be stably moved along the heart-shaped cam groove 1e.

According to the structure of the above embodiment, since the slide member 5 disposed in the housing 1, in which the card 6 is to be mounted, in such a manner that with the insertion and ejection of the card, the slide member is engaged with the card 6 and can be moved in the insertion and ejection direction of the card, is formed by punching one metal plate into a necessary shape and bending it at plural places, and in the slide member 5, the lock pin urging part 5c for supporting the lock pin 3 to enable swing and for urging its one end toward the heart-shaped cam groove 1e formed in the housing 1, the elastic fastening part 5j for holding the card 6 at the mount position by engagement with the fastening recess part 6b of the card 6, and the guide part 5m for guiding movement when the slide member 5 is moved in the insertion and ejection direction of the card are integrally formed by bending the metal plate, the elastic fastening part 5j, together with the slide member, for holding the card at the mount position and the lock pin urging part 5c for urging the lock pin 3 are integrally formed, and therefore, the number of parts of the ejection mechanism for inserting and ejecting the card can be reduced, the number of assembling steps is reduced, and the assembling workability is simplified, so that a low price can be realized.

As described above, the card connector device of the invention comprises the housing in which the card is mounted, the slide member disposed to engage with the card and to be movable in the insertion and ejection direction of the card as the card is inserted and ejected, the return spring for urging the slide member toward the ejection direction of the card, and the lock means including the lock pin and the heart-shaped cam groove along which the lock pin slides, for locking the slide member at the mount position of the card against the urging force of the return spring and for releasing the lock by moving the slide member from the lock position to the back side, and the slide member is formed of one metal plate, and in the slide member, the lock pin urging part for supporting the lock pin to enable swing and for urging its one end toward the heart-shaped cam groove, the elastic fastening part for holding the card at the mount position by engagement with the fastening recess part of the card, and the guide part for guiding movement when the card is moved in the insertion and ejection direction are integrally formed by bending, and therefore, since the elastic fastening part, together with the slide member, for holding the card at the mount position and the lock pin urging part for urging the lock pin can be integrally formed, the number of parts of the ejection mechanism for inserting and ejecting the card can be reduced, the number of assembling steps is reduced, and the assembling workability is simplified, so that a low price can be realized.

Besides, the heart-shaped cam groove is formed at the front end side of the housing in the card insertion direction, the lock pin sliding along the heart-shaped cam groove projects from the front edge part of the slide member and is supported, and the lock pin urging part is shaped into the plate spring having elasticity by folding back the front edge part of the slide member rearward, and therefore, since the lock pin does not project forward greatly, it becomes unnecessary to take the large movement stroke of the slide member, and the depth size of the housing can be made small.

Besides, the lock pin urging part is provided with the insertion part through which the one end side of the lock pin is inserted to enable swing, the folded parts positioned at both edges of the insertion part, and the pressing part coupled to the folded parts, for urging the one end of the lock pin toward the heart-shaped cam groove, and the pressing part is formed to be long in the direction orthogonal to the projecting direction of the lock pin, and therefore, when the lock pin is horizontally swung with the shaft hole as the fulcrum, since a constant urging force can be exerted at any position irrespective of a swing position, the lock pin can be stably moved along the heart-shaped cam groove.

Besides, the projecting parts projecting from the front edge part of the slide member are formed in the folded parts, and the one end of the lock pin is disposed between both the projecting parts, and therefore, since the projecting parts are provided, the one end side of the lock pin inserted through the insertion part to enable swing is restrained by the projecting parts, and it is possible to prevent sliding down or the like of the lock pin at the time of assembling.

Besides, the return spring for urging the slide member toward the ejection direction of the card is disposed at the rear end side of the housing in which the heart-shaped cam groove is formed at the front end side, and the slide member is formed to overlap with the heart-shaped cam groove when the slide member is moved to the mount position of the card, and therefore, since the lock pin does not project forward greatly, the length of the return spring can be made long by that, and the ejection stroke of the card can be made large.

Besides, the guide part is formed by bending the one side edge part of the slide member toward the inner bottom surface side of the housing, and the concave guide groove corresponding to the one side edge part is formed in the inner bottom surface of the housing, and therefore, by providing the guiding groove with which the guide part of the slide member is engaged, the slide member can be smoothly moved in the insertion and ejection direction of the card.

What is claimed is:

1. A card connector device comprising:
   a housing in which a card is mounted;
   a slide member disposed to engage with the card and to be movable in an insertion and ejection direction of the card as the card is inserted and ejected;
   a return spring which is configured to urge the slide member toward the ejection direction of the card;
   lock means including a lock pin and a heart-shaped cam groove along which the lock pin slides, which is configured to lock the slide member at a mount position of the card against an urging force of the return spring and which is configured to release a lock by moving the slide member from the lock position to a back side;
   a lock pin urging part which is configured to support the lock pin to enable swing and which is configured to urge its one end toward the heart-shaped cam groove;
   an elastic fastening part which is configured to hold the card at the mount position by engagement with a fastening recess part of the card;
   a guide part which is configured to guide movement when the card is moved in the insertion and ejection direction;
   an elastic fastening part provided at the slide member and including an elastic arm part extending and capable of elastically deforming along a length direction of the slide member; and
   an engagement projecting part provided at the center of the elastic arm part and engaging with a fastening recess part formed at a side part of the card,
   wherein the slide member, the lock pin, the elastic fastening part, the guide part, the elastic fastening part, and the engagement projecting part constitute a single metal part.

2. The card connector device as recited in claim 1, wherein the heart-shaped cam groove is formed at a front end side of the housing in the card insertion direction, the lock pin sliding along the heart-shaped cam groove projects from a front edge part of the slide member and is supported, and the lock pin urging part is shaped into a plate spring having elasticity.

3. The card connector device as recited in claim 2, wherein the lock pin urging part is provided with an insertion part through which one end side of the lock pin is inserted to enable swing, folded parts positioned at both edges of the insertion part, and a pressing part coupled to the folded parts, which is configured to urge one end of the lock pin toward the heart-shaped cam groove, and the pressing part is formed to be long in a direction orthogonal to a projecting direction of the lock pin.

4. The card connector device as recited in claim 3, wherein projecting parts projecting from the front edge part of the slide member are formed in the folded parts, and the one end of the lock pin is disposed between both the projecting parts.

5. The card connector device as recited in claim 1, wherein a return spring which is configured to urge the slide member toward the ejection direction of the card is disposed at a rear end side of the housing in which the heart-shaped cam groove is formed at a front end side, and the slide member is formed to overlap with the heart-shaped cam groove when the slide member is moved to the mount position of the card.

6. The card connector device as recited in claim 1, wherein the guide part is formed by bending one side edge part of the slide member toward an inner bottom surface side of the housing, and a concave guide groove corresponding to the one side edge part is formed in the inner bottom surface of the housing.

* * * * *